(12) United States Patent
Williams

(10) Patent No.: US 7,218,203 B2
(45) Date of Patent: May 15, 2007

(54) MOTION ACTIVATED REMINDER SYSTEM

(76) Inventor: Gene Williams, 1700 E. 12th St., Lynn Haven, FL (US) 32444

( * ) Notice: Subject to any disclaimer, the term of this patent is extended or adjusted under 35 U.S.C. 154(b) by 95 days.

(21) Appl. No.: 10/882,724

(22) Filed: Jul. 1, 2004

(65) Prior Publication Data

US 2004/0252011 A1    Dec. 16, 2004

Related U.S. Application Data

(63) Continuation-in-part of application No. 09/851,488, filed on May 8, 2001.

(51) Int. Cl.
*H04Q 7/00* (2006.01)
*G05B 23/02* (2006.01)
*G10K 11/00* (2006.01)
*H04M 1/64* (2006.01)
*G10L 21/00* (2006.01)

(52) U.S. Cl. .......................... 340/7.3; 340/3.1; 340/3.3; 367/197; 367/198; 367/199; 379/74; 379/80; 379/88.04; 379/100.08; 704/273; 704/275; 704/246

(58) Field of Classification Search ................. 340/3.3, 340/3.1; 367/197, 198, 199; 379/74, 80, 379/88.04, 100.08; 704/273, 275, 246
See application file for complete search history.

(56) References Cited

U.S. PATENT DOCUMENTS

| | | | | |
|---|---|---|---|---|
| 5,349,636 | A * | 9/1994 | Irribarren | 379/88.15 |
| 5,406,618 | A * | 4/1995 | Knuth et al. | 379/88.04 |
| 5,949,852 | A * | 9/1999 | Duncan | 379/67.1 |
| 6,483,695 | B1 * | 11/2002 | Hartstein | 361/680 |

* cited by examiner

*Primary Examiner*—Jeffery Hofsass
*Assistant Examiner*—Scott Au
(74) *Attorney, Agent, or Firm*—Myers & Kaplan, LLC; Sandra M. Drummond, Esq.; Joel D. Myers, Esq.

(57) ABSTRACT

A motion activated, voice controlled reminder system, wherein a programmable device automatically reminds the intended receiver of a future event, without any extraordinary action on the part of the recipient, thus enabling the user to, via a telephone, leave a message on a recording unit, specifying a date for message delivery, wherein the message is stored in a microprocessor until the programmed date, whereupon when motion is detected by the motion detector, the microprocessor audibly announces the reminder message.

14 Claims, 3 Drawing Sheets

MOTION ACTIVATED REMINDER SYSTEM

CROSS-REFERENCE TO RELATED APPLICATIONS

To the full extent permitted by law, the present application claims priority to and the benefit as a continuation-in-part application to non-provisional patent application entitled "Motion Activated Communication Device," filed on May 8, 2001, having assigned Ser. No. 09/851,488.

TECHNICAL FIELD

The present invention relates generally to electronic mail and voice messaging and, more specifically, to a motion activated, voice controlled reminder system.

BACKGROUND ART

In today's busy world, many households depend on electronic messaging, voice messaging or answering machines in order to communicate with others. Voice mail and electronic mail have become preferred methods of communicating with family, friends and acquaintances who cannot be reached directly, particularly those who live outside of a local calling area. These systems have also become heavily relied upon to serve as personal reminder dockets.

Unfortunately, however, important reminders and/or messages are often left unheard or unread for an extended period of time, sometimes because it can be inconvenient to check for messages. Many people simply forget to sign onto an e-mail system or to promptly check their answering machine or voice mail system for the presence of messages and/or reminders. Moreover, some systems include an automatic deletion feature wherein voice messages and e-mails are automatically removed after a certain number of days, thus resulting in the possibility that some messages and/or reminders are never heard or read.

There are devices available wherein checking for messages and/or reminders is made more convenient. For instance, an audible signal can be provided in the form of a special telephone dial tone to alert a user that unheard voice mail messages are present. This, however, requires a person to go to the telephone to listen for the special dial tone, often to find no messages present. Although visual message indicators such as light accessories are available, such devices are often not effective. For electronic mail, many systems place an indicator on a service provider's home page to indicate whether mail messages are waiting. This disadvantageously requires visual contact and an affirmative act.

An additional inconvenience associated with retrieving messages and/or reminders from voice mail and electronic mail is that one must be within physical proximity of the telephone or the computer in order to provide the telephone pad control or the keyboard and cursor manipulation necessary to control the playback commands.

Electronic message retrieval can be even more restrictive than voice message retrieval because it requires the user to remain at the personal computer in order to access, read and respond to the message. In addition, a user must typically go through a sign-on sequence before they can check for the presence of messages, with no assurance that messages are present. This process wastes time with disadvantageous and irritating inconvenience when no messages and/or reminders are present.

An automatic, convenient method of announcing to a user that reminders and/or messages are present would eliminate this waste of time, increase the convenience of using electronic messaging and/or voice messaging, both as reminders and generally as messages, and eliminate unnecessary efforts that result when no messages are present. A new and improved reminder system would free electronic reminder messaging and voice reminder messaging operations from the requirement of user action through automation, in addition to eliminating the often frustrating physical limitations of the workstation or telephone. It is, therefore, to the provision of such an improvement that the present invention is directed.

BRIEF SUMMARY OF THE INVENTION

Briefly described, in a preferred embodiment, the present invention overcomes the above-mentioned disadvantages by providing a motion activated, voice controlled reminder system, wherein a programmable device automatically reminds the intended receiver of a future event, without any extraordinary action on the part of the recipient.

Generally, the present invention, in the preferred embodiment, comprises a motion detector, a router, a voice recording unit, a speaker, a telephone and a microprocessor.

More specifically, via a telephone, a user leaves a message on a recording unit, specifying a date or dates for message delivery. The message is stored in a microprocessor until the programmed date, whereupon when motion is detected by the motion detector, the microprocessor audibly announces the reminder message. If the user acknowledges receipt of the message by depressing an appropriate button or switch, the message will not be replayed.

In an alternate embodiment, specific instructions can be received by the microprocessor from a vocabulary of voice commands corresponding to desired actions, such as, for exemplary purposes only, "play message tomorrow" or "delete message."

In another alternate embodiment, the motion activated reminder system could be programmed to receive and retain messages for a plurality of individuals, wherein each individual could have an individual system passcode or username, whereby messages so encoded could be routed to and announced in response to activation of a motion detector positioned in the private quarters of the associated individual.

In another alternate embodiment, reminder messages could be input into the motion activated reminder system via direct entry into the microprocessor unit, or via email or other electronic means.

A feature and advantage of the present invention is to provide a new and improved motion activated reminder system, wherein automatic playback of recorded messages is provided.

Another feature and advantage of the present invention is to provide a new and improved motion activated reminder system wherein hands-free control and delivery of messages is provided.

Another feature and advantage of the present invention is to provide a new and improved motion activated, voice controlled communication device wherein hands free control and delivery of electronic messages is provided.

Another feature and advantage of the present invention is to provide a new and improved motion activated reminder system to remind a professional, sporting enthusiast, parent, or any individual of an upcoming appointment, game, activity, birthday, payment due date, routine maintenance chore, or any other notable scheduled event.

Another feature and advantage of the present invention is to provide a new and improved motion activated reminder system that enables a message to be programmed to be announced on a repeating basis, such as for exemplary purposes only, daily, weekly, biweekly, monthly, semi-annually, annually, or at any other appropriate frequency.

These and other objects, features and advantages of the invention will become more apparent to one skilled in the art from the following description and claims when read in light of the accompanying drawings.

DETAILED DESCRIPTION OF THE PREFERRED AND ALTERNATE EMBODIMENTS

In describing the preferred embodiment of the present invention as illustrated in the figures, specific terminology is employed for the sake of clarity. The invention, however, is not intended to be limited to the specific terminology so selected, and it is to be understood that each specific element includes all technical equivalents that operate in a similar manner to accomplish similar functions.

With regard to all such embodiments as may be herein described and contemplated, it will be appreciated that optional features, including, but not limited to, aesthetically pleasing coloration and surface design, and labeling and brand marking, may be provided in association with the present invention, all without departing from the scope of the invention.

Figure 1:
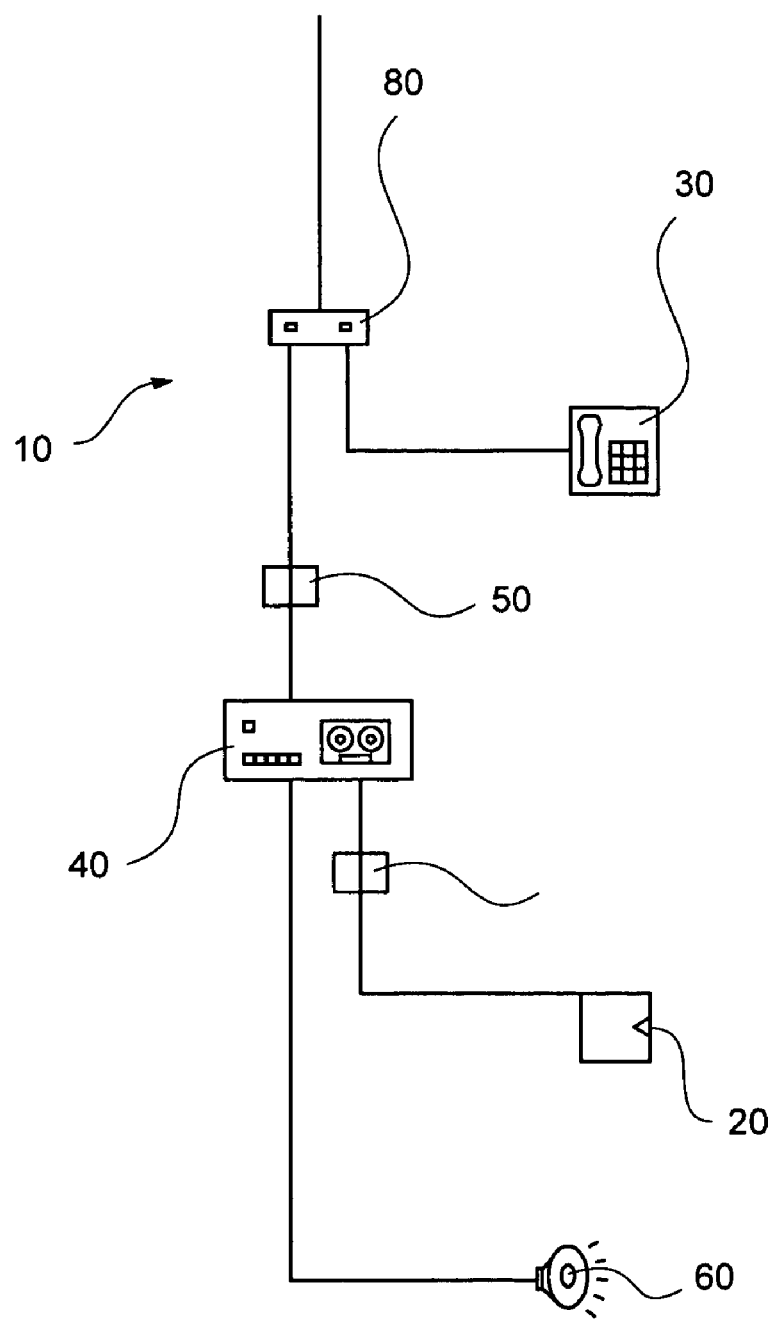
FIG. 1 is a schematic diagram of the present invention, according to the preferred embodiment.

Now referring to FIG. 1, system 10 generally comprises motion detector 20, telephone 30, recording unit 40, microprocessor 50, speaker 60, and router 80. However, it should be noted that one or more of the aforementioned components could be integrated in an alternate embodiment.

Motion detector 20 preferably detects motion within a predetermined range and transmits an input signal to microprocessor 50. Motion detector systems are well known within the art. In addition, for exemplary purposes, infrared radiation, optical systems, microwave or any type of motion detection can be used in conjunction with system 10 to detect motion within the vicinity of sensor 20.

Preferably, upon receipt of signal from motion detector 20, microprocessor 50 audibly announces, via speaker 60, the ripe, stored messages. The user can preferably press a button or the like in order to acknowledge proper receipt of the message.

Messages are preferably recorded via coded telephone access, or could alternately be recorded via microphone 70 using a voice command to indicate the desire to record a message, such as, for exemplary purposes only, a reminder that will be delivered at a future, designated date. Messages are preferably stored on recording unit 40. Microprocessor 50 will deliver a message from storage on the designated date.

For example, a user can record a reminder message to initiate an audible reminder on a specified date regarding an appointment, family occasion or event. Such reminder messages can be programmed one-year or more in advance, thereby enabling preset audible reminders for each such recurring event, such as, for exemplary purposes only, birthdays and anniversaries. Further, system 10 is useful to be reminded, for example, of a payment schedule involving a series of payments due to be paid. A professional could utilize system 10 to be reminded of an upcoming appointment as he or she enters his or her office. A sporting enthusiast could be reminded of an upcoming sporting event in order to timely purchase tickets. Other possibilities include, without limitation, parents wishing to be reminded a day in advance of their children's scheduled activities, or a homeowner wishing to be reminded every three months to change the air conditioning filter. Such a user can preferably access system 10 to record a reminder message by utilizing a telephone line at a remote location and supplying a preset code, preferably including three digits. Preferably, the preset code enables identification of the user by microprocessor 50, wherein the message can be properly authorized for subsequent delivery at the proper date and/or time.

For example, a vacationing user can telephone to program reminders for events scheduled upon his or her return. In addition, system 10 can be utilized for medical reminders, such as, for exemplary purposes only, scheduled medications, blood pressure or blood sugar checks, treatments or appointments, wherein such medical reminders can be input directly by the user or by a medical professional via telephone access, wherein the user could supply the medical professional with a code.

Figure 2:
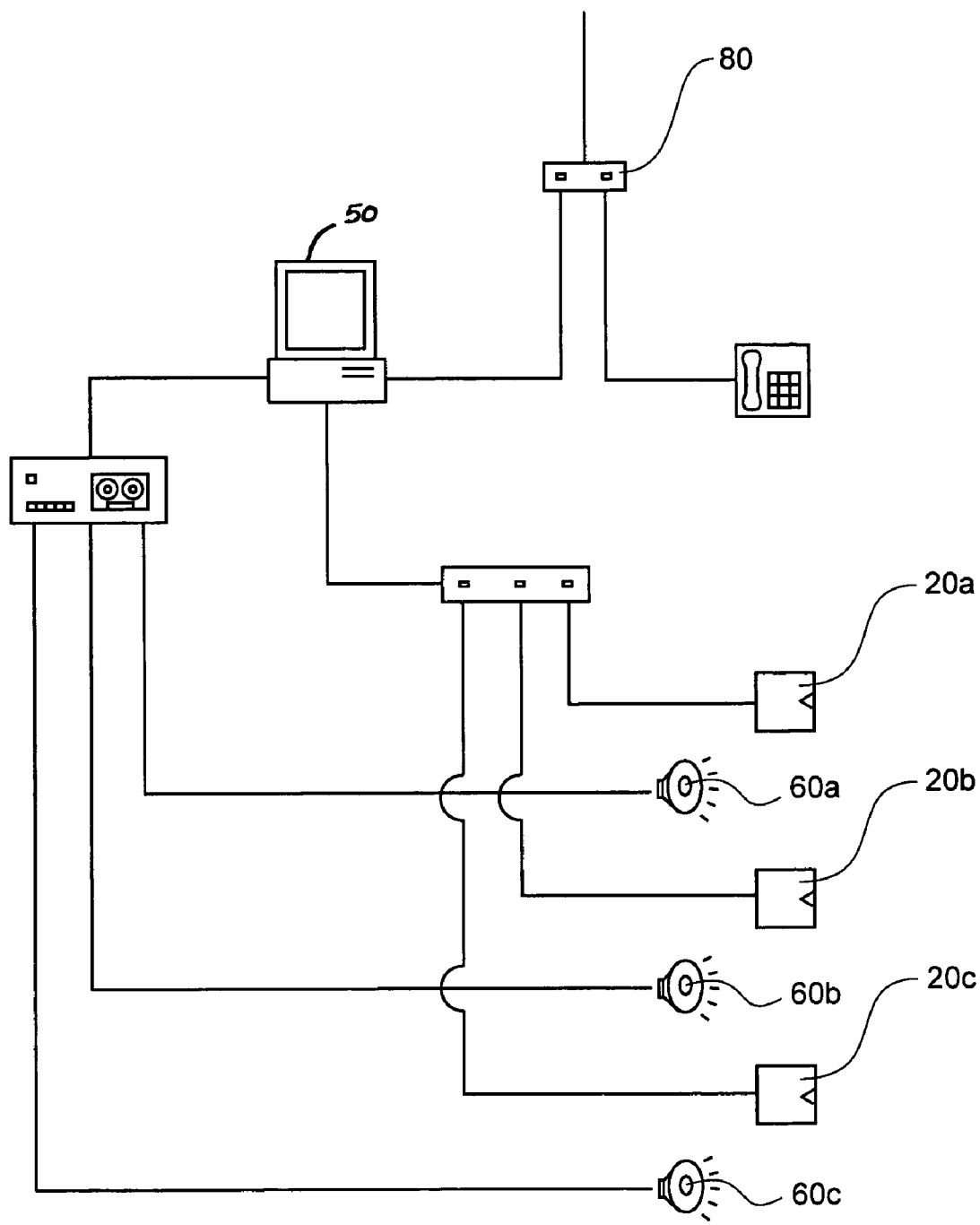
FIG. 2 is a schematic diagram of the present invention, according to an alternate embodiment.
Figure 3:
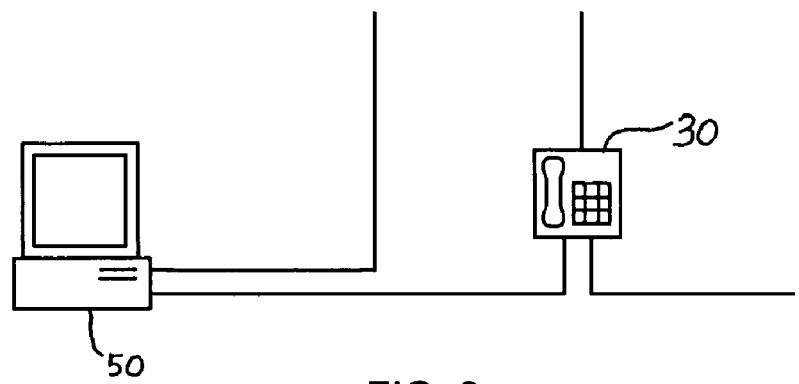
FIG. 3 is a plan view of the present invention, according to the preferred embodiment, showing the linked telephone and the microprocessor.
Figure 4:
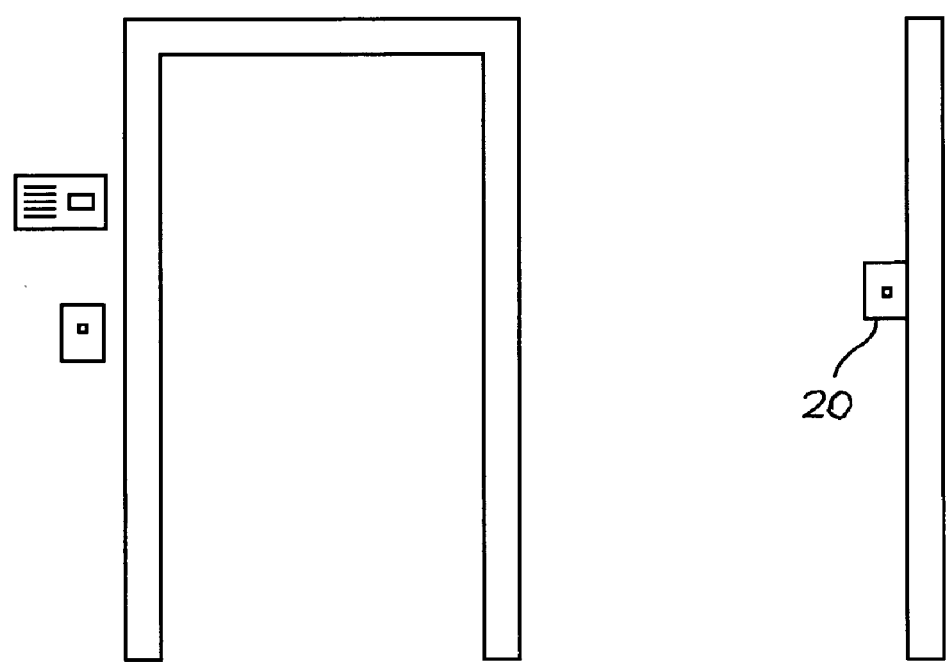
FIG. 4 is a plan view of the present invention, according to the preferred embodiment, showing the interior of a room, the motion detector, the motion activated speaker, and the phone jack.

Referring now to FIG. 2, there is shown an alternate embodiment motion activated reminder system 110 having a plurality of motion sensors 20a, 20b and 20c and a plurality of respectively related speakers 60a, 60b and 60c. This alternate system 110 enables simultaneous use by a plurality of users at a single location, wherein each user has an individual code, identification number, password, or the like, whereby microprocessor 50 is able to segregate messages and deliver, via router 80, to the appropriately related speaker 60a, 60b or 60c upon activation signal from motion sensor 20a, 20b or 20c. Thus, each user of the plurality can automatically receive reminder messages within the privacy of his or her own quarters.

In an alternate embodiment, messages and/or reminders could be entered or "recorded" via electronic mail, wherein motion activated reminder system 10 could interface with electronic mail systems. Programmed electronic mail messages and/or reminders could be converted by microprocessor 50 into synthetic speech, thus allowing the audible message announcement following activation of motion detector 20.

In an alternate embodiment, a user could access system 10 to record a reminder message by utilizing a telephone line at a remote location and supplying a preset code, preferably including three digits. Preferably, the preset code enables identification of the user by microprocessor 50, wherein the message can be sent, via router 80, to the proper location.

In another alternate embodiment, messages could be recorded via microphone 70, or could be recorded via name recognition from outside callers. That is, an outside caller could call telephone 30 and receive an outgoing voice message with selections including delivery at a caller-selected date and/or time. The caller could use the telephone keypad to enter the date and/or time for message replay and could either select the recipient from a listing, or could speak the name, wherein microprocessor 50 would hear and recognize the choice of a preprogrammed name and the message would be routed accordingly via router 80.

In an alternate embodiment, once microprocessor 50 announces a stored message to the user via speaker 60, microprocessor 50 then pauses for a defined time period awaiting a voice command. If no command is issued within the pre-described time period, system 10 resets to await the next input signal from motion detector 20. Voice commands are received at microphone 70, wherein microphone 70 is operational in the audio range of human voice. Specific voice commands are predetermined, wherein microprocessor 50, upon detecting speech, processes the input signal to recognize the voice command. Following recognition of the voice command, microprocessor 50 executes the command through the use of a vocabulary of voice commands according to software programming within microprocessor 50.

Microprocessor 50 responds to a vocabulary of delivered voice commands, such as, for exemplary purposes only, "play," "save," "erase" or "end". As one such example, the command responsive to receipt of a message may be the word "repeat". When microprocessor 50 receives a command, a programmed response is preferably initiated. In this example, in response to voice command "repeat", a switch would begin replay of the message. Or, for example, the voice command "erase" would end the replay of the message and reset device 10.

In another alternate embodiment, system 10 could be set according to a timer, thereby permitting response to input signal from motion detector 20 only during certain time intervals, such as, for exemplary purposes only, the time of day when the user typically returns from work. As such, system 10 would not respond to motion activation during periods of time outside this time frame.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims:

What is claimed is:

1. A system for managing messages, comprising:
   means for retrievably storing a message having content for transmission on at least one specified date;
   means for audibly transmitting the stored message content;
   a plurality of motion detectors; and
   a router, wherein said router associates each retrievably stored message with at least one motion detector of said plurality of motion detectors, wherein each motion detector of said plurality of motion detectors is adapted to be selectively associated with at least one recipient, wherein said means for retrievably storing a message, said means for retrieving a message and said means for audibly transmitting the stored message content are in communication with said router, wherein upon said at least one specified date, at least one said motion detector transmits a signal upon detection of motion within said selected range of the area targeted by said motion detector selectively associated with said at least one recipient intended to receive the message, and said system activates said means for transmitting, thereby audibly transmitting stored message proximate the selectively associated area.

2. The system for managing messages of claim 1, wherein at least one said motion detector is an infrared radiation detector.

3. The system for managing messages of claim 1, wherein at least one said motion detector is an optical system.

4. The system for managing messages of claim 1, further comprising a voice control system, wherein said voice control system receives, recognizes and interprets a plurality of voice commands and directs said microprocessor in accordance with a control objective of each said voice command.

5. The system for managing messages of claim 4, wherein said microprocessor utilizes a software programmed vocabulary to execute said control objective of each said voice command.

6. The system for managing messages of claim 1, further comprising a timer apparatus, wherein operation of at least one said motion detector is limited to a specified interval of said timer apparatus.

7. The system for managing messages of claim 1, wherein said means for retrievably storing the message is a recording unit, said recording unit enabling receipt, storage and playback of a plurality of messages;
   and wherein said means for retrieving a message and said means for transmitting the stored message to a user comprise a microprocessor, wherein said microprocessor receives said signal from at least one said motion detector and wherein said microprocessor receives commands from a voice control system, said voice control system having a microphone and said voice control system enabling a user to verbally command said microprocessor; a speaker, wherein said speaker is activated by said microprocessor in response to said signal from said motion detector, wherein said speaker audibly announces information regarding status and operation of said recording unit, and wherein said speaker is responsive to said microprocessor via said voice control system and audibly communicates each ripe message from said recording unit; and a message monitoring means.

8. The system for managing messages of claim 7, wherein said recording unit receives a message from an incoming telephone call.

9. The system for managing messages of claim 7, wherein said recording unit receives a message from said microphone.

10. The system for managing messages of claim 1, wherein said means for retrieving the stored message and said means for audibly transmitting the stored message to a user comprise a microprocessor, wherein said microprocessor receives said signal from said motion detector, wherein said microprocessor includes communication software for controlling communications in a telephone system, and wherein said microprocessor receives commands from a voice control system, said voice control system having a microphone and said voice control system enabling a user to verbally command said microprocessor; a speaker, wherein said speaker is activated by said microprocessor in response to said signal from said motion detector, wherein said speaker audibly announces information regarding status and operation of a voice mail system, and wherein said speaker is responsive to said microprocessor via said voice control system and audibly communicates each ripe message received and stored by the voice mail system; and a message monitoring means, wherein said message monitoring means responds to an audible indicator of the voice mail system to indicate the presence of a ripe message received and stored by the voice mail system, and wherein said means for retrievably storing a message is a voice mail systems interface, said voice mail systems interface enabling said microprocessor to utilize an external telephone line to access and operate the voice mail system.

11. The system for managing messages of claim 1, wherein said means for retrieving a message and said means for transmitting a message to a user comprise a microprocessor, wherein said microprocessor receives said signal from said motion detector and wherein said microprocessor receives commands from a voice control system, said voice control system having a microphone and said voice control system enabling a user to verbally command said microprocessor; a speaker, wherein said speaker is activated by said microprocessor in response to said signal from said motion detector, wherein said speaker audibly announces a message from an electronic mail system, and wherein said speaker is responsive to said microprocessor via said voice control system and audibly communicates each message of said plurality of messages received and stored by the electronic mail system; and wherein said means for retrievably storing a message is a computer unit interface, said computer unit interface enabling said microprocessor to access and operate the electronic mail system.

12. A system for managing messages, comprising:

a router;

a plurality of motion detectors, wherein each said motion detector of said plurality of motion detectors is adapted to be selectively associated with at least one user recipient, wherein said router associates each message with at least one motion detector of said plurality of motion detectors according to said associated at least one user recipient, wherein said at least one motion detector transmits a signal upon detection of motion within a selected range of said communication system, and wherein each message is transmitted proximate the area targeted by said motion detector of said plurality of motion detectors that is selectively associated with said at least one user recipient intended to receive the message;

a microprocessor, wherein said microprocessor receives, stores, and sorts the messages according to delivery parameters selected from a group comprising day, date, time of day, elapsed time, month, or year, wherein said microprocessor receives said signal from said at least one motion detector, and wherein upon receipt of said signal from said at least one motion detector, said microprocessor facilitates transmission of the messages according to said delivery parameters; and at least one speaker, wherein said at least one speaker is activated by said microprocessor in response to said signal from said at least one motion detector, and wherein said at least one speaker is responsive to said microprocessor and audibly communicates the transmitted message according to said delivery parameters for said at least one user recipient intended to receive the message.

13. The system for managing messages of claim 12, further comprising:

a voice control system, said voice control system having a microphone, said voice control system enabling a user to verbally command said microprocessor; and wherein said voice control system receives, recognizes and interprets a plurality of voice commands and directs said microprocessor in accordance with a control objective of each said voice command; and a computer interface unit, said computer interface unit enabling said microprocessor to access and operate an electronic mail system.

14. A system for managing messages, comprising:

means for retrievably storing a message for transmission after at least one elapsed time period following message receipt;

means for transmitting the message to a user;

a plurality of motion detectors for detecting motion, wherein said means for retrievably storing a message, said means for retrieving the message and said means for transmitting the message to a user are in communication with said plurality of motion detectors, and a router, wherein said router associates each received message with at least one motion detector of said plurality of motion detectors, wherein each motion detector of said plurality of motion detectors is adapted to be selectively associated with at least one user recipient, and wherein a received message is transmitted proximate the area targeted by said motion detector of said plurality of motion detectors that is selectively associated with said at least one user recipient intended to receive the message, and if said at least one elapsed time period has expired, activates said means for transmitting the message.

* * * * *